US011483506B2

(12) United States Patent
Malone et al.

(10) Patent No.: US 11,483,506 B2
(45) Date of Patent: Oct. 25, 2022

(54) CONTINUOUSLY INTEGRATING DIGITAL PIXEL IMAGER

(71) Applicant: Raytheon Company, Waltham, MA (US)

(72) Inventors: Neil R. Malone, Goleta, CA (US); Michael J. Batinica, Goleta, CA (US)

(73) Assignee: RAYTHEON COMPANY, Waltham, MA (US)

( * ) Notice: Subject to any disclaimer, the term of this patent is extended or adjusted under 35 U.S.C. 154(b) by 28 days.

(21) Appl. No.: 16/424,779

(22) Filed: May 29, 2019

(65) Prior Publication Data

US 2020/0382732 A1    Dec. 3, 2020

(51) Int. Cl.
*H04N 5/378* (2011.01)
*H04N 5/3745* (2011.01)

(52) U.S. Cl.
CPC ........... *H04N 5/378* (2013.01); *H04N 5/3745* (2013.01)

(58) Field of Classification Search
CPC .... H04N 5/378; H04N 5/3745; H04N 5/2355; H04N 5/355
See application file for complete search history.

(56) References Cited

U.S. PATENT DOCUMENTS

| | | | |
|---|---|---|---|
| 5,565,915 A | 10/1996 | Kindo et al. | |
| 6,384,413 B1 | 5/2002 | Pain | |
| 2008/0284888 A1* | 11/2008 | Kobayashi | H04N 5/37455 348/308 |
| 2009/0244346 A1 | 10/2009 | Funaki | |
| 2010/0140732 A1 | 6/2010 | Eminoglu et al. | |
| 2010/0194956 A1* | 8/2010 | Yuan | H04N 5/3658 348/308 |
| 2010/0226495 A1 | 9/2010 | Kelly et al. | |
| 2013/0278804 A1 | 10/2013 | Denham et al. | |
| 2014/0061442 A1 | 3/2014 | Denham | |
| 2016/0285444 A1 | 9/2016 | Denham et al. | |
| 2018/0041727 A1 | 2/2018 | Lund et al. | |
| 2018/0152644 A1 | 5/2018 | Kondo et al. | |
| 2018/0262705 A1 | 9/2018 | Park et al. | |
| 2018/0376082 A1 | 12/2018 | Liu | |

OTHER PUBLICATIONS

Fossum, et al. "Infrared Readout Electronics for Space Science Sensors: State of the Art and Future Directions" Center for Space Microelectronics Technology, 24 pages.

(Continued)

*Primary Examiner* — Nicholas G Giles
(74) *Attorney, Agent, or Firm* — Cantor Colburn LLP

(57) ABSTRACT

An imaging device includes an image detector that includes an array of digital pixels, each digital pixel including an output that provides a digital pixel output pulse each time a charge stored in the digital pixel exceeds a threshold and a readout integrated circuit (ROIC) connected to the output of each of the digital pixels to receive the digital pixel output pulse from each pixel, the ROIC including a plurality of accumulators, each of the plurality of accumulators associated with a respective digital pixel. The imaging device also includes a controller that reads the accumulators to determine a number of digital pixel output pulses stored by the accumulators without stopping the generation of digital pixel output pulses.

11 Claims, 6 Drawing Sheets

(56) References Cited

OTHER PUBLICATIONS

Guellec, et al. "Roic Development at CEA for SWIR Detectors: Pixel Circuit Architecture and Trade-Offs" International Conference on Space Optics, ICSO 2014, Oct. 7-10, 2014, 8 pages.
Shafique, et al. "Digital pixel readout integrated circuit architectures for LWIR" Proc. of SPIE vol. 9451, 8 pages (Downloaded From: http://spiedigitallibrary.org/ on Dec. 3, 2015 Terms of Use: http://spiedigitallibrary.org/ss/TermsOfUse.aspx).
Notification of Transmittal of the International Preliminary Report on Patentability of the International Searching Authority, or the Declaration; PCT/US2020/032779; dated Dec. 9, 2021, 14 pages.

* cited by examiner

CONTINUOUSLY INTEGRATING DIGITAL PIXEL IMAGER

BACKGROUND

The present disclosure relates to a digital pixel imager, and in particular, to a continuously integrating digital pixel imager.

In legacy analog imagers, particularly infrared imagers, photocurrent from a detector diode is integrated by a well or integration capacitor coupled to the detector diode, and then once per video frame, the voltage or charge of the well capacitor is transferred to a down-stream analog-to-digital converter (ADC), where the voltage is converted to a binary value.

One type of in-pixel ADC circuit utilizes an injection transistor such as a direct injection (DI) transistor or a buffered direct injection (BDI) transistor. In such circuits, charge from a photodiode is accumulated on an integration capacitor during an integration period. When the end of the period is reached, the charge stored in integration capacitor is provided to a readout circuit that converts the charge into a digital value. The integration period defines a so-called "frame." Such a circuit can be referred to as analog pixel. In an analog pixel, the amount of charge that can be stored is limited by the size of the integration capacitor. In this manner, the size of the integration capacitor directly controls the frame length and the dynamic range of the pixel.

Another approach is provide a so-called digital in-pixel read-out integrated circuits (DROICs). In general, a DROIC can include a smaller integration capacitor without limiting dynamic range. This is accomplished by utilizing a quantizing analog front end circuit which accumulates charge over a relatively small capacitor, trips a threshold that results in incrementing a counter, and resets the integration capacitors and repeats the process again. This pattern is repeated as more photocurrent integrates. In short, a digital pixel keeps count of the number of times the integration capacitor is "filled" during a frame. However, sensitivity and dynamic range of such a DROIC is limited by the frame period. In particular, an imager that includes digital pixels will, at the end of each frame, read the counters of each digital pixel and may also readout via an ADC circuit any residual charge in the integration capacitor that was below the threshold required to increment the counter. In general, such systems can work for their intended purpose. However, as the skilled artisan will realize, the frame will limit how long faint objects in a scene can be integrated.

SUMMARY

According to one embodiment, an imaging device is disclosed. The imaging device includes an image detector that includes an array of digital pixels, each digital pixel including an output that provides a digital pixel output pulse each time a charge stored in the digital pixel exceeds a threshold and a readout integrated circuit (ROIC) connected to the output of each of the digital pixels to receive the digital pixel output pulse from each pixel, the ROIC including a plurality of accumulators, each of the plurality of accumulators associated with a respective digital pixel. The imaging device also includes a controller that reads the accumulators to determine a number of digital pixel output pulses stored by the accumulators without stopping the generation of digital pixel output pulses.

In an imaging device of any prior embodiment, the accumulators are counters.

In an imaging device of any prior embodiment, each digital pixel includes: photodiode; an integration capacitor arranged to receive a photocurrent from the photodiode at an input and to store charge developed from the photocurrent, the integration capacitor coupled between the input and a reset voltage; and a comparator coupled to the input that generates the digital pixel output pulse when the stored charge exceeds the threshold.

In an imaging device of any prior embodiment, the digital pixel includes an injection transistor disposed between the photodiode and the integration capacitor that controls flow of the photocurrent from the photodiode to the integration capacitor, the injection transistor having a gate, a source electrically coupled to the photodiode, and a drain electrically coupled to the integration capacitor at the input.

In an imaging device of any prior embodiment, the controller samples a first accumulator at a first rate and, based on information in the first accumulator, samples a second accumulator.

In an imaging device of any prior embodiment, the controller samples the second accumulator when the first accumulator exceeds a sampling threshold.

In an imaging device of any prior embodiment, the controller samples a first accumulator of the plurality of accumulators at a first rate and a second accumulator of the plurality of accumulators at second rate that is different than the first rate.

In one embodiment, a method of operating an imaging device is disclosed. The imaging device includes an image detector that includes an array of digital pixels, each digital pixel including an output, a readout integrated circuit (ROIC) connected to the output of each of the digital pixels and including a plurality of accumulators, each of the plurality of accumulators associated with a respective digital pixel, and a controller. The method includes: generating a digital pixel output pulse, by a first digital pixel of the array of digital pixels, when a charge stored in the first digital pixel exceeds a threshold; receiving, by the ROIC, the digital pixel output pulse via the digital pixel output; sampling with the controller a first accumulator of the plurality of accumulators at a first rate, the first accumulator associated with the first digital pixel; and based on information in the first accumulator, sampling a second accumulator of the plurality of accumulators with the controller. The sampling comprises reading the digital pixel output pulses stored in the first and second accumulators without stopping the generation of further digital pixel output pulses by the array of digital pixels.

In a method of any prior embodiment, the controller samples the second accumulator when the first accumulator exceeds a threshold.

In a method of any prior embodiment, the controller samples the first accumulator at a first rate and second accumulator at second rate that is different than the first rate.

In a method of any prior embodiment, the accumulators are counters and the method further includes incrementing the accumulator to which the digital pixel output is assigned each time a digital pixel output pulse is received.

In one embodiment, an alternative imaging device is disclosed. The alternative imaging device of this embodiment includes an image detector that includes an array of digital pixels, each digital pixel including an output that provides a digital pixel output pulse each time a charged stored in the digital pixel exceeds a threshold, and a readout integrated circuit (ROIC) connected to the output of each of the digital pixels and to receive the digital pixel output pulse from each pixel, the ROIC including a serializer that produces a serializer data output each time a digital pixel output pulse is received, the serializer data output including in indication of a position on the image detector of a pixel that produced the received digital pixel output pulse. The imaging device also includes a controller that receives the serializer data output without stopping the generation of digital pixel outputs.

In the alternative imaging device of any prior embodiment, the indication of the position includes a row and a column.

In a device of any prior additional comprising a clock that provides a time to the serializer.

In the alternative imaging device of any prior embodiment, the serializer data output includes a time stamp based on the time provided to the serializer by the clock when the digital pixel output pulse was received.

In the alternative imaging device of any prior embodiment, each digital pixel includes: a photodiode; an integration capacitor arranged to receive a photocurrent from the photodiode at an input and to store charge developed from the photocurrent, the integration capacitor coupled between the input and a reset voltage; and a comparator coupled to the input that generates the digital pixel output pulse when the stored charge exceeds the threshold.

In another embodiment, an alternative method of operating an imaging device is disclosed. In this method the imaging device includes: an image detector that includes an array of digital pixels, each digital pixel including an output, a readout integrated circuit (ROIC) including a serializer, and a controller. In this embodiment the method includes generating digital pixel output pulses, by the array of digital pixels, when a charge stored in the one of the array of digital pixels exceeds a threshold; receiving, by the serializer, the digital pixel output pulses via the digital pixel outputs; each time a digital pixel output pulse is received by the serializer, generating the serializer data output, the serializer data output including in indication of a position on the image detector of the digital pixel that produced the received digital pixel output pulse; and providing the serializer data output to the controller without stopping the generation of additional digital pixel output pulses by the array of digital pixels.

In a method of any prior embodiment where the device includes a serializer, the indication of the position includes a row and a column.

In a method of any prior embodiment where the device includes a serializer, the method can further include providing a time from a clock to the serializer and the serializer data output includes a time stamp based on the time provided to the serializer by the clock when the received digital pixel output pulse was received Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
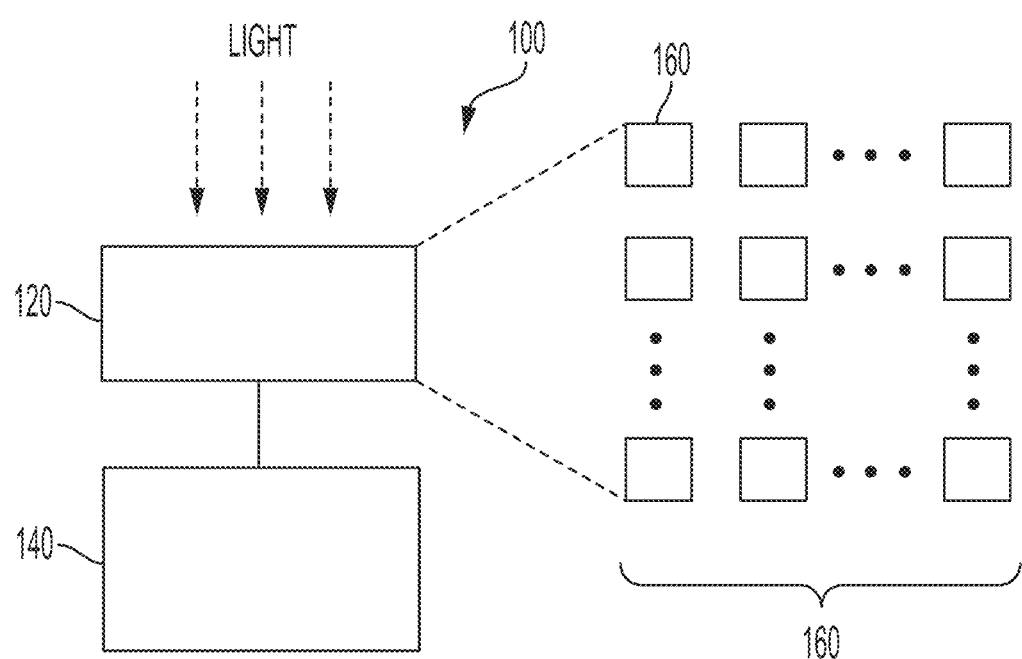
FIG. 1 is a schematic diagram illustrating image detector in accordance with embodiments.

FIG. 1 is a schematic diagram illustrating an image detector 100 in accordance with embodiments. Such a detector 100 may be deployed, for example, on a satellite or other airborne apparatus such as an aircraft or any land- or sea-based tactical application in which it is a requirement that frame rate not be limited by array size. Image detector 100 may be a focal plane array (FPA), active pixel sensor (APS) or any other suitable energy wavelength sensing device. The image detector 100 may be used as a component of a photographic and/or image capturing device, such as a digital camera, video camera or other similar device. The image detector 100 may include a detection device 120 and a readout integrated circuit (ROIC) 140.

The detection device 120 includes an array of photosensitive/energy wavelength sensitive detector unit cells 160 arranged in an X×Y matrix. Each of the detector unit cells 160 may accumulate charge or produce a current and/or voltage in response to light incident upon the detector unit cell 160 and may correspond to a pixel in a captured electronic image. One or more of the detector unit cells 160 may include a photovoltaic detector (e.g., a photovoltaic single absorber detector or a photovoltaic multi-absorber (multi-junction) detector), a barrier device detector, a position sensitive detector (PSD) or other suitable detector.

In embodiments herein, each detector unit cell 160 is a photodiode. Each can be a digital pixel that is more fully described below. In general, the detector unit cells 160 will include a photodiode and circuitry that produces a "count" or "digital pixel output" each time the amount of charge accumulated on an integration capacitor exceeds a threshold.

The readout may be used for processing of the incident light (e.g., to create an image representative of the incident light). For example, the ROIC 140 interfaces with the detection device 120 to receive a signal, such as the counts/digital pixel output.

The ROIC 140 may include connections to each pixel to receive such a count based on the received inputs, enabling the ROIC 140 to produce an output such as an image. It shall be understood that FIG. 1 is provided as a general description of how an image detector 100 works and is not mean to be limiting.

In-pixel ADC imagers are used to address decreasing pixel size. In particular, in-pixel ADC imaging improves photo-charge capacity for infrared imaging and other applications as the size of pixels continues to decrease. A good in-pixel ADC design can store nearly all of the available photo-charge from a detector diode and thus improve signal to noise ratio (SNR) to near theoretical limits. A common method of integration for in-pixel ADC circuits uses a quantizing analog front end circuit which accumulates charge over a relatively small capacitor, trips a threshold and is then reset. This pattern is repeated as more photocurrent integrates. A pixel so configured is referred to as "digital pixel."

Figure 2:
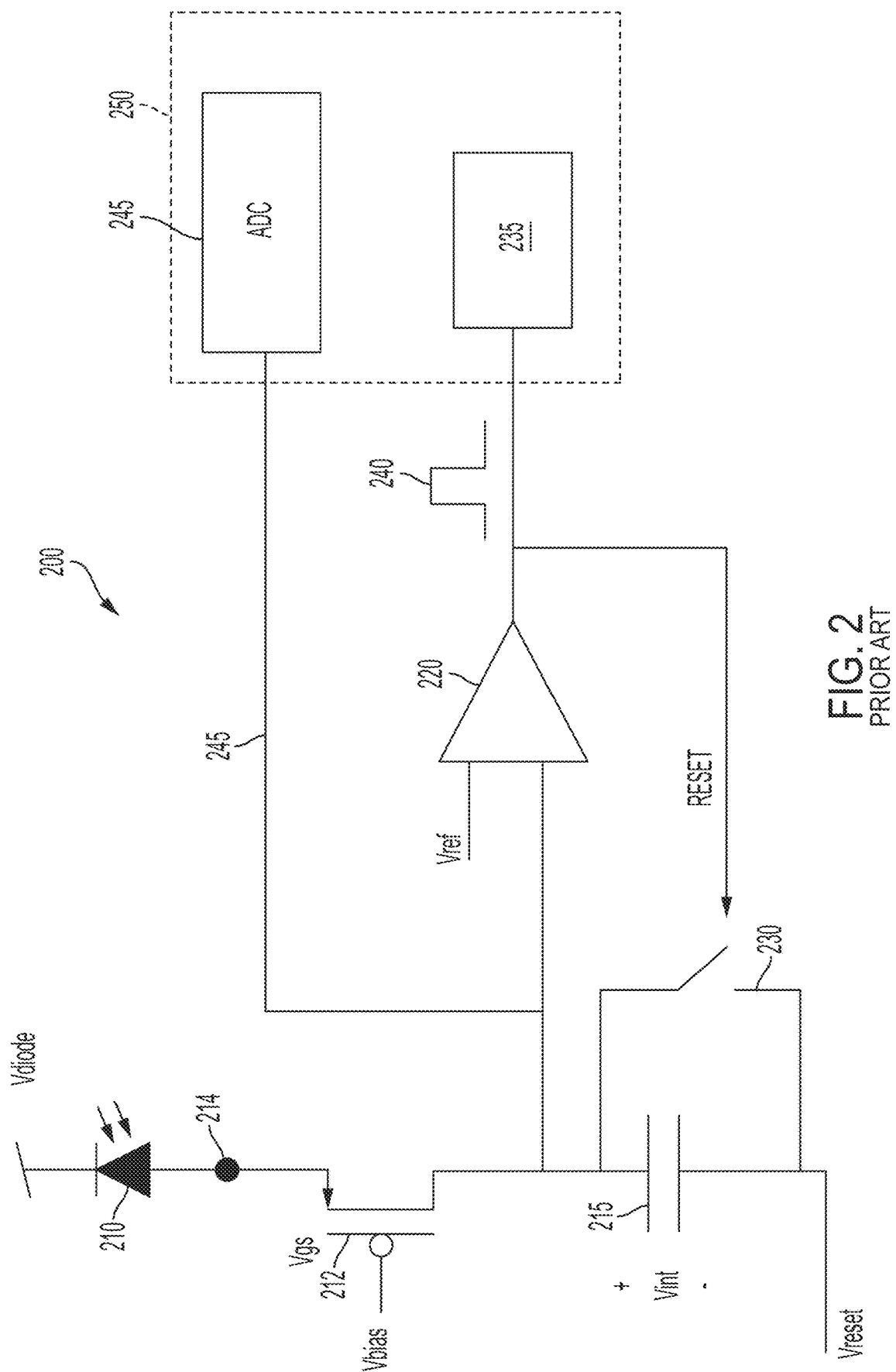
FIG. 2 is a schematic diagram illustrating a digital pixel connected to a read out integrated circuit (ROIC) that includes a counter and an analog to digital converter.

An example of a digital pixel 200 is illustrated in FIG. 2. Charge from a photodiode 210 (e.g., from a detector unit cell 160) due to incident energy (e.g., light) is accumulated on an integration capacitor 215. As charge is accumulated on the integration capacitor 215 it is compared to a threshold voltage (Vref) by a comparator 220. When the voltage across the integration capacitor 215 (referred to as Vint herein) exceeds Vref the capacitor 215 is reset via a reset switch 230 that receives a control signal Reset generated by the pulse 240 created by the comparator 220. During a reset, a voltage equal to the difference between Vref and Vreset is subtracted from the integration capacitor 215.

The flow of current from the photodiode 210 is controlled by an injection transistor 212. The gate of the injection transistor 212 is coupled to a bias voltage Vbias. The level of this voltage can be selected by the skilled artisan and is used, in part, to keep the photodiode 210 in reverse bias where the voltage at node 214 is lower than the diode supply voltage Vdiode. If the voltage at node 214 exceeds Vbias by a source-to-gate voltage (Vgs), charge in the photodiode 210 is allowed to pass through the injection transistor 212 for accumulation by the integration capacitor 215.

Each reset event is accumulated (counted) with a digital counter circuit 235 that can be part of, for example, a ROIC 250. At each frame, a "snapshot" of the contents of the digital counter circuit 235 is copied into a register or memory and read out, line by line. This digital pixel 200 operates to exponentially increase the well capacity $Q_{INT}$ of the integration capacitor 215 by a factor of $2^N$, where N is the size of the digital counter circuit 235. Thus, by conserving the photo-charge relationship within a frame period, this type of read-out digital pixel 200 may achieve improved signal-to-noise ratio.

The example digital pixel 200 illustrated in FIG. 2 is an asynchronous circuit. In asynchronous in-pixel ADCs, the comparator reset event occurs as soon as the voltage on the integrating capacitor 215 crosses the comparator threshold Vref Generally speaking, the value in the digital counter circuit 235 at the end of frame is the "amount" of the light incident on a particular photodiode 210 during that frame. Of course, after the integration time expires, any residual charge accumulated on the integration capacitor 215 can be read out by, for example, an additional ADC 245 such as a single slope ADC, contained in the ROIC 250. The total "read" at the frame end the number of counts times the amount of charge stored in the capacitor (Vref-Vreset) plus any residual in the integration capacitor 215.

In the above system, integration typically stops at the end of a frame and is restarted after each pixel has been read out. Further, all information in each counter for every pixel of the array is read and the counters reset at the end of each frame.

Herein is a disclosed a system where a digital pixel is continuously integrating photons and updating accumulators outside the pixel, either synchronously or asynchronously. The accumulators can either be physical counters in the ROIC or "memory counters" that have include a listing of the time each pixel generates an output (e.g., output pulse 240).

In the DROICs disclosed herein, no frame circuitry or residual ADCs are required, thereby making the architecture much simpler and compact. As more fully discussed below, such a system/approach can provide for extended continuous integration periods for both low and high signal (brightness) objects and the effective frame is controlled asynchronously by the higher level system which queries a counter memory without any impact to the pixel unit cell. The counter memory can either be directly triggered by the output (e.g., output pulse 240) or each pulse can activate a row/column output that a serializer attaches a time stamp to. Because there is no "frame", the need for an ADC, such as ADC 245, to determine residual charge disappears and this element can be omitted from the ROIC 250. The skilled artisan will realize that for long integration times, this removal of the ADC will result in only (at most) a least-significant-bit error as compared to having the ADC. Indeed, in the case were counts for a "dim" pixel control operations related to counts in other "bright" pixels, the dim pixel can have virtually no error while the error in a bright pixel is generally negligible (i.e., less that one LSB count on a large total number of counts).

Figure 3:
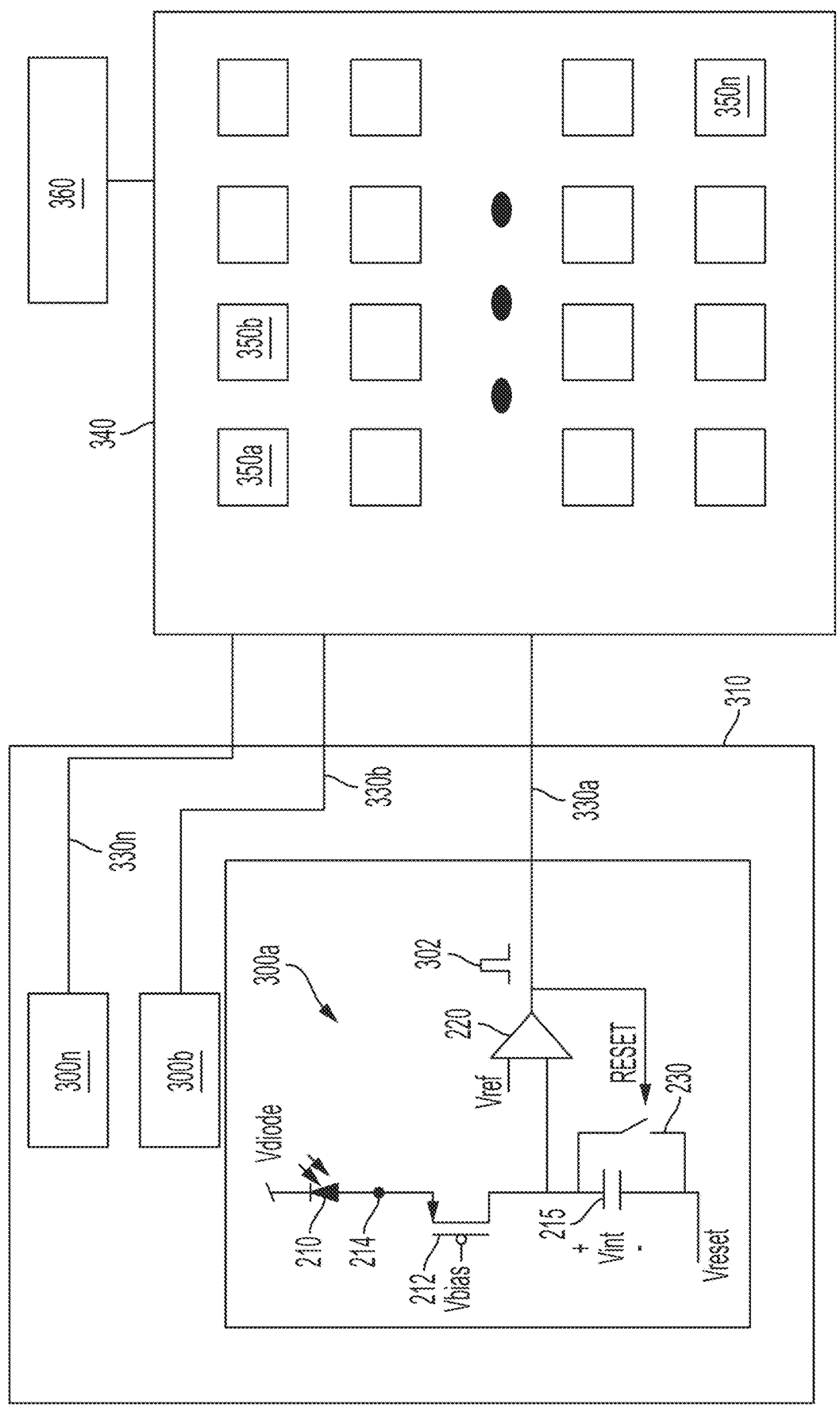
FIG. 3 is block diagram of an image detector of one embodiment that includes a ROIC were digital pixel outputs of each digital pixel are assigned to a respective accumulator that can be sampled by a controller.

FIG. 3 shows an example of a system according to one embodiment. The system includes an array 310 with a plurality of pixels 300a-300n. While three pixels are shown, any number can be included. Each pixel 300a-300n is associated with an accumulator 350a-350n in the ROIC 340. For example, a first pixel 300a is associated with a first accumulator 340a, a second pixel 300b is associated with a second accumulator 340b, and an nth pixel 300n is associated with an nth accumulators 340n. The accumulators can be counters in one embodiment.

Each pixel operates generally in the same manner as described above. However, the ADC 245 is not required in this embodiment. The following description applies to all pixels in array (e.g., 300a-300h) and, as such, reference number 300 is used to refer to a general digital pixel.

As before, the comparator 220 of the digital pixel 300 will create an output pulse 302 when Vint exceeds Vref. The pulse 302 can also be referred to as a digital pixel output and is provided on a pixel output connection 330a of the digital pixel 300a.

Regardless of the name given to the output of the comparator 220 (pulse or digital pixel output), the fact that the pulse 302 was created is provided to the ROIC 340. The ROIC 340 includes a plurality of accumulators 350, each of which is associated with a different one of the pixels 300 in an array 310. This is indicated in FIG. 3 where accumulator 350a is associated with pixel 300a, accumulator 350b is associated with pixel 300b, and so on. As such, the ROIC 340 is connected to the output 330a-n of each of the digital pixels 300a-300n and receives the digital pixel output from each pixel.

A controller 360 can periodically query one or more of the accumulators 350 without stopping the integration in the pixels 300. Indeed, such sample can occur at a rate that is faster than the rate that a pixel fills an integration capacitor (e.g., a sample rate greater than a kHz).

Assume that the first pixel 300a is receiving light from a bright star and the second pixel 300b is hardly receiving hardly any light at all. If a frame was applied, in some instances, there may only be "residual" charge in pixel 300b with no counts in accumulator 340b. However, by monitoring accumulator 340b the controller 360 can determine when pixel 300b has achieved a desired number of counts. At that time, the number of counts in accumulator 340a can be read. In this manner, only a small output of data is transferred to the controller 360 (e.g., it only has to monitor the counts provided to one accumulator 340a or 340b). This allows high speed querying that is independent of pixel operation and allows for both small and large signals (e.g., dim and bright regions) to be monitored at the same time and still allows for sufficient resolution of the dim region.

Given this freedom, it shall be understood dim areas can be integrated for long periods of time to increase signal to noise ratio and the received light can determine how often the brighter areas (or other areas) are read. An example is instructive. Consider the case where the array 310 is used in a situation where a bright guide star is used to orient a telescope but the area of interest is a faint star in the same field of view. The integration time can be determined based on when "enough" information has been received in the faint area. In this manner, the number of desired counts will set a variable integration time. Other examples exist such as in situations of star based navigation systems and in faint target seeker application.

In one embodiment, the largest time period that can be utilized is set based on the dark current of the photodiodes. "Dark current" is the residual electric current flowing in a photoelectric device when there is no incident illumination. In another embodiment, this upper limit is set based on integration of background photons and/or noise. Within the upper limit, the controller 360 can sample any number of the accumulators 340 in an on demand basis without affecting operation of any pixel. That is, the controller 360 can sample/monitor all accumulators 340 or can only sample a subset.

As will be understood, in the above embodiment or any other embodiment disclosed herein, because there is no "system wide" reset due to a sample, there is not a time when all pixels 300 are simultaneously reset. Rather, each pixel is reset (e.g., charge is subtracted from the integration capacitor 215) based on its own rate and, thus, there can be a reduction of correlated noise.

Figure 4:
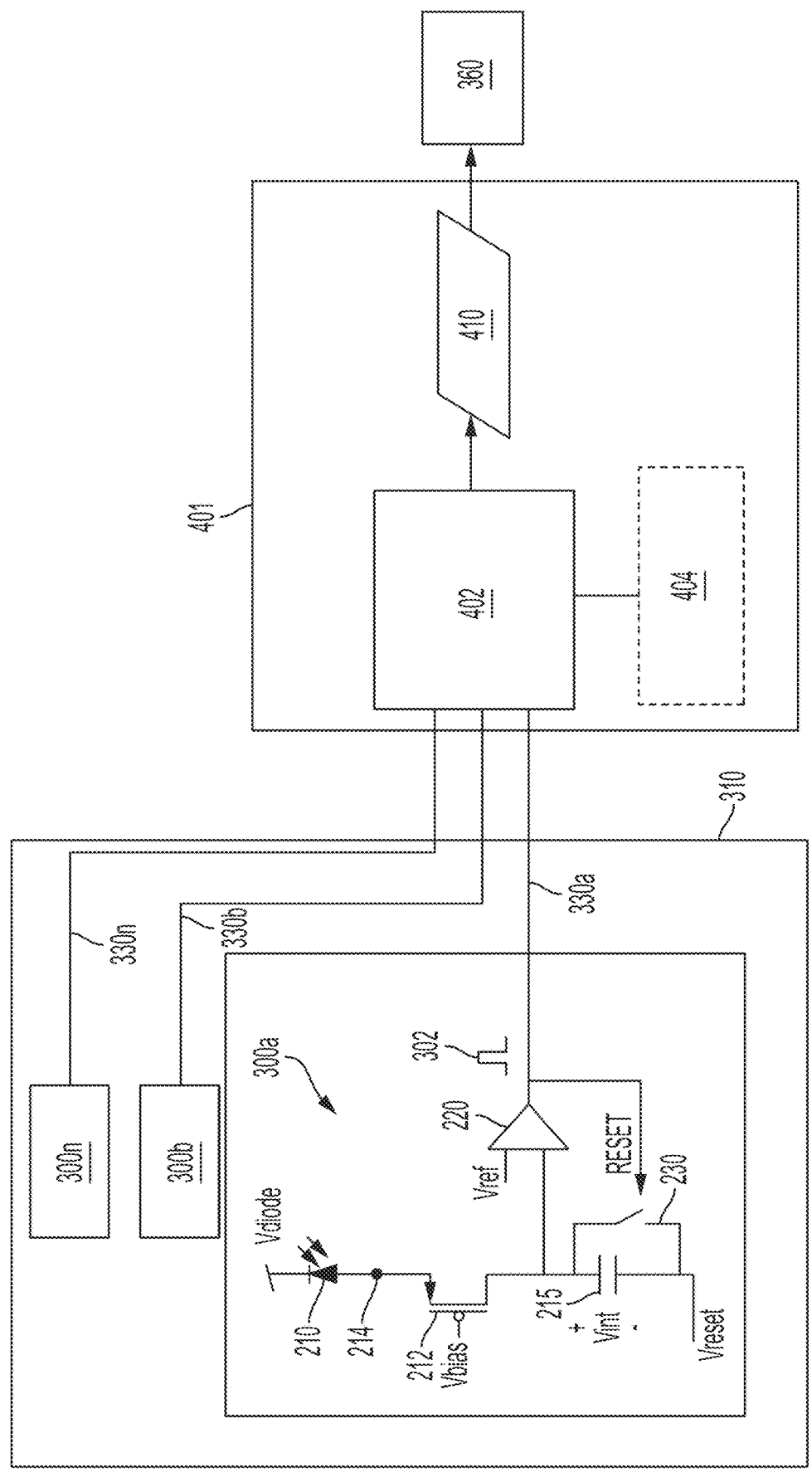
FIG. 4 is block diagram of an image detector of one embodiment that includes a serializer that generates a serializer output count each time one of the digital pixels provides a digital pixel output.

In another embodiment, rather than including an accumulator for each pixel, a serializer can be provided as shown in FIG. 4. The serializer 402 receives all output pulses received from the array 310 via the pixel output connections 330. The serializer 402 produces output data 410 each time an output pulse 302 is received in one embodiment. The output data 410 can include an indication of the row/column of the pixel 300 that generated the output pulse 302. The output data 410 is received by the controller 360. In one embodiment, the controller 360 can apply a time stamp to the output data each time it is received.

In another embodiment, the output data 410 can also include a time stamp indicating when the pulse was received. To that end, the system in FIG. 4 can also include an optional clock 404 connected to the serializer 402. In such an embodiment, the serializer 402 thus forms the output data 410 from the received output pulse 302 and the time the pulse 302 received as indicated by the clock 404.

The skilled artisan will realize that by implementing a continuous integration as shown in FIG. 4, the controllers herein disclosed can operate as a delta-sigma processor.

Figure 5:
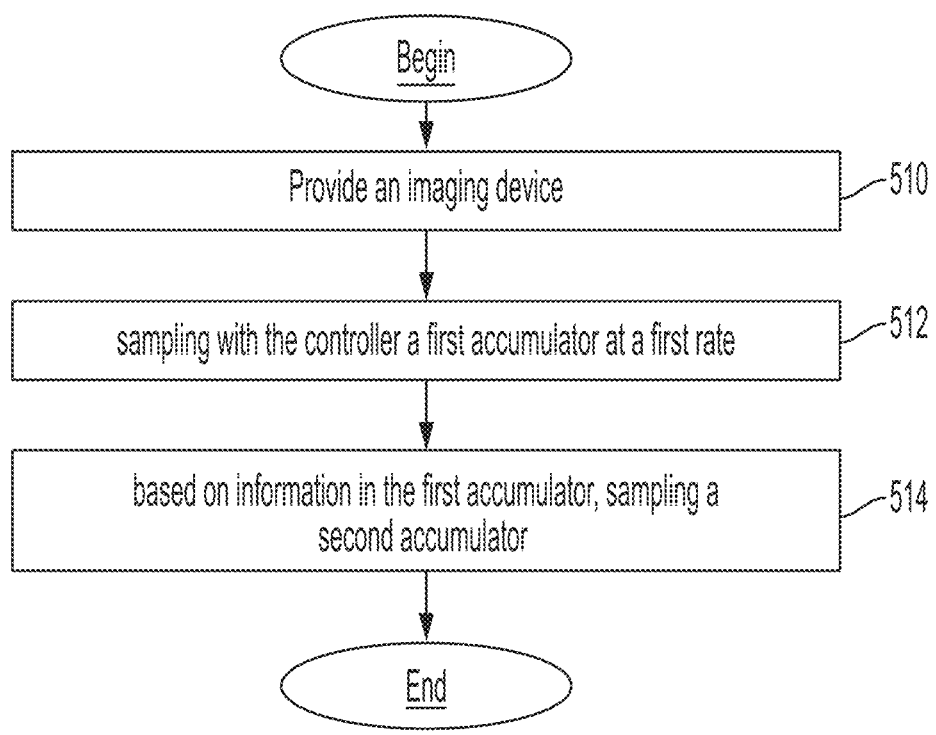
FIG. 5 is flow chart of a method according to one embodiment.

With reference now to FIG. 5, a method of operating an imaging device is is disclosed. At block 510, and imaging device is provided.

The device can include, for example, and referring to FIGS. 3 and 4, an image detector that includes an array 310 of digital pixels 300, each digital pixel 300 including an output 330 that provides a digital pixel output pulse 302 each time a charged stored in the digital pixel 300 exceeds a threshold. The device can also include a ROIC 340 connected to the output 330 of each of the digital pixels 300 and that receives the digital pixel output pulse 302 from each pixel 300, the ROIC 340 including a plurality of accumulators 350, each of the plurality of accumulators 350 associated with a respective digital pixel 300. The device can further include a controller 360 that reads the accumulators 350 to read the number of digital pixel output pulses 302 stored by the accumulators 350 without stopping the generation of digital pixel output pulses 302.

At block 512, a first accumulator is sampled with the controller at a first rate. This can include, for example, the controller 360 sampling a first accumulator 350a connected to a first digital pixel 300a. Based on information from the first accumulator, as shown at block 514 the second accumulator can be sampled and that sampling can be a separate rate.

In one embodiment, the digital pixel output is received by the ROIC, the accumulators are counters. In such an embodiment, the method can also include incrementing the accumulator to which the digital pixel output is assigned each time digital pixel output pulse is received.

Figure 6:
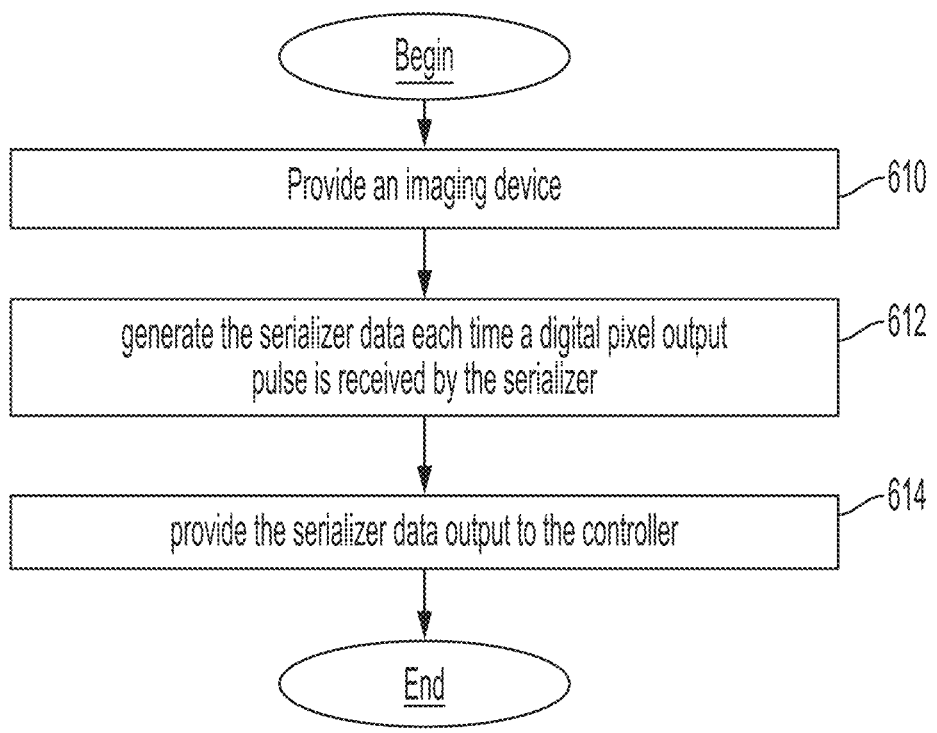
FIG. 6 is flow chart of a method according to one embodiment.

FIG. 6 shows another method of operating an imaging device. At block 610 an imaging device is provided. The imaging device can include an image detector that includes an array 310 of digital pixels 300, each digital pixel 330 communicating via an output 330 that provides a digital pixel output pulse 302 each time a charged stored in the digital pixel 300 exceeds a threshold. The device can also include a ROIC 401 including a serializer 402 that produces a serializer data output 410, and a controller 360 that receives the serializer data output 410 without stopping the generation of digital pixel output pulses 302.

At block 612, each time a digital pixel output pulse 302 is received by the serializer 402, the serializer 402 generates the serializer data output 410. In one embodiment, the serializer data output 410 includes an indication of a position on the image detector of a pixel 300 that produced the received digital pixel output pulse 302. In one embodiment, the indication of the position includes a row and a column.

Regardless of format, at block 614 the serializer data output 410 is provided to the controller 360.

In one embodiment, the method can also include providing a time from a clock 404 to the serializer. In such an embodiment, wherein the serializer data output includes a time stamp based on the time provided to the serializer by the clock when the received digital pixel output pulse was received.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. An imaging device comprising:
an image detector that includes an array of digital pixels, each digital pixel including an output that provides a digital pixel output pulse each time a charge stored in the digital pixel exceeds a threshold;
a readout integrated circuit (ROIC) connected to the output of each of the digital pixels to receive the digital pixel output pulse from each pixel, the ROIC including a plurality of accumulators, wherein each individual accumulator of the plurality of accumulators is individually connected to different individual digital pixel; and
a controller that reads the accumulators to determine a number of digital pixel output pulses stored by the accumulators without stopping the generation of digital pixel output pulses;
wherein the controller samples a first accumulator connected to a first pixel at a first rate and, based on information in the first accumulator, samples a second accumulator connected to a second pixel at a second rate.

2. The imaging device of claim 1, wherein the accumulators are counters.

3. The imaging device of claim 1, wherein each digital pixel includes:
a photodiode;
an integration capacitor arranged to receive a photocurrent from the photodiode at an input and to store charge developed from the photocurrent, the integration capacitor coupled between the input and a reset voltage; and
a comparator coupled to the input that generates the digital pixel output pulse when the stored charge exceeds the threshold.

4. The imaging device of claim 3, wherein the digital pixel includes an injection transistor disposed between the photodiode and the integration capacitor that controls flow of the photocurrent from the photodiode to the integration capacitor, the injection transistor having a gate, a source electrically coupled to the photodiode, and a drain electrically coupled to the integration capacitor at the input.

5. The imaging device of claim 1, wherein the controller samples the second accumulator when the first accumulator exceeds a sampling threshold.

6. The imaging device of claim 1, wherein the controller samples a first accumulator of the plurality of accumulators at a first rate and a second accumulator of the plurality of accumulators at second rate is different than the first rate.

7. A method of operating an imaging device, the imaging device including an image detector that includes an array of digital pixels, each digital pixel including an output, a readout integrated circuit (ROIC) connected to the output of each of the digital pixels and including a plurality of accumulators, wherein each individual accumulator of the plurality of accumulators is individually connected to different individual digital pixel, and a controller, with the method comprising:
generating a digital pixel output pulse, by a first digital pixel of the array of digital pixels, when a charge stored in the first digital pixel exceeds a threshold;
receiving, by the ROIC, the digital pixel output pulse via the digital pixel output;
sampling with the controller a first accumulator of the plurality of accumulators at a first rate, the first accumulator associated with the first digital pixel; and
based on information in the first accumulator, sampling a second accumulator associated with a second digital pixel of the plurality of accumulators with the controller,
wherein sampling comprises reading the digital pixel output pulses stored in the first and second accumulators without stopping the generation of further digital pixel output pulses by the array of digital pixels.

8. The method of claim 7, wherein the controller samples the second accumulator when the first accumulator exceeds a threshold.

9. The method of claim 7, wherein the controller samples the first accumulator at a first rate and second accumulator at second rate that is different than the first rate.

10. The method of claim 7, wherein the accumulators are counters and the method further includes incrementing an accumulator to which the digital pixel output is assigned each time a digital pixel output pulse is received.

11. An imaging device comprising:
an image detector that includes an array of digital pixels, each digital pixel including an output that provides a digital pixel output pulse each time a charge stored in the digital pixel exceeds a threshold;
a readout integrated circuit (ROIC) connected to the output of each of the digital pixels to receive the digital pixel output pulse from each pixel, the ROIC including a plurality of accumulators, wherein each individual accumulator of the plurality of accumulators is individually connected to a different individual digital pixel in the array of digital pixels; and
a controller that reads the accumulators to determine a number of digital pixel output pulses stored by the accumulators without stopping the generation of digital pixel output pulses;
wherein the individual accumulators include a first accumulator connected to a first digital pixel and a second accumulator connected to a second digital pixel and the second accumulator is sampled based on information in the first accumulator.

* * * * *